United States Patent [19]

Lance

[11] 4,367,695
[45] Jan. 11, 1983

[54] BARREL DOG HOUSE

[76] Inventor: Thomas N. Lance, 9410 Shaner, Rockford, Mich. 49341

[21] Appl. No.: 277,280

[22] Filed: Jun. 25, 1981

[51] Int. Cl.³ ............................................. A01K 1/00
[52] U.S. Cl. .................... 119/19; 248/156; 248/158
[58] Field of Search ...................... 119/19, 3; 248/156, 248/158; D30/1

[56] References Cited

U.S. PATENT DOCUMENTS

| D. 100,281 | 7/1936 | Norton | D30/1 |
| D. 215,306 | 9/1969 | Hoff | D30/1 |
| 1,010,213 | 11/1911 | Anderson | 119/45 R |
| 1,366,710 | 1/1921 | Anker | 248/156 |
| 1,634,209 | 6/1927 | Reiber | 119/23 |
| 1,687,790 | 10/1928 | Powers | 248/158 |
| 2,642,245 | 12/1950 | Rice et al. | 248/150 |
| 2,861,764 | 3/1955 | Fisher | 248/146 |
| 3,017,858 | 6/1960 | Brown | 119/23 |
| 3,178,142 | 4/1965 | Koch | 248/156 |
| 3,387,811 | 7/1966 | Adams | 248/146 |
| 3,797,461 | 3/1974 | Breedon | 119/19 |
| 3,843,079 | 10/1974 | Reisling | 248/156 |
| 3,960,111 | 6/1976 | Harris, Sr. et al. | 119/23 |

Primary Examiner—Robert A. Hafer
Attorney, Agent, or Firm—Waters, Lesniak & Willey

[57] ABSTRACT

A barrel dog house is provided which utilizes a unique mounting means which comprises a bracket having a central mounting portion adapted to be mounted on a vertical pole and at least four radially extending barrel support arms. Two of the support arms are opposed side arms which are contoured to conform to at least the lower side wall contour of the barrel, and the other two of the support arms are generally horizontal opposing fore and aft arms. The mounting means is mounted to the top end of a vertical pole and a barrel is mounted on the mounting means with the barrel having an opening in one end for ingress and egress.

2 Claims, 4 Drawing Figures

BARREL DOG HOUSE

BACKGROUND OF THE INVENTION

1. Field of the Invention

The present invention relates to dog houses, and, more particularly, to a barrel dog house which utilizes a unique mounting means.

2. Description of the Prior Art

A vast array of dog houses have been designed and utilized over the years. While the individual designs of these dog houses vary greatly, the inexpensive variety tend to have one thing in common. They rest on the ground. The problem with this is severalfold. The dog is in close proximity to cold or wet ground during particular seasons. In the case of heavy snowfall, the house is virtually surrounded by snow and ingress and egress is hampered. Unless external means of shade are provided, the only shade available to the dog is inside of the house. Finally, when a plurality of dog houses are to be utilized in the same area, these conventional dog houses require a considerable amount of area beyond the side walls of the dog houses to keep the dogs separated. Accordingly, these is a continuing need for an improved dog house which would eliminate the shortcomings of the conventional dog houses, which is inexpensive and which is ideally suited for use when multiple dog houses are to be utilized in a given area.

SUMMARY OF THE INVENTION

According to the present invention there is provided a barrel dog house comprising a mounting pole, a unique mounting means mounted to one end of the pole and a barrel mounted on the mounting means with an opening in one end for ingress and egress.

The unique mounting means comprises a bracket having a central mounting portion adapted to be mounted on a vertical pole and at least four radially extending barrel support arms. Two of the support arms are opposed side arms which are contoured to conform to at least the lower side wall contour of the barrel, and the other two support arms are generally horizontal opposing fore and aft arms. Means are provided for rigidly attaching the central mounting portion of the bracket and each of the support arms to the barrel. Preferably, the underside of the mounting portion has thread means to threadably engage the top of a threaded vertical mounting pole. Alternately, the central mounting portion includes a depending collar sized to fit over the top of a vertical mounting pole with means to prevent rotation of the collar on the pole.

The barrel dog house with its unique mounting means locates the dog house off of cold wet ground and above any snow. It creates shade for the dog to rest in no matter where located. In addition, in the case where multiple dog houses are required, the unique dog houses of the present invention can be placed closer together than conventional dog houses thereby maximizing the efficiency of space utilization.

DESCRIPTION OF THE PREFERRED EMBODIMENTS

Figure 1:
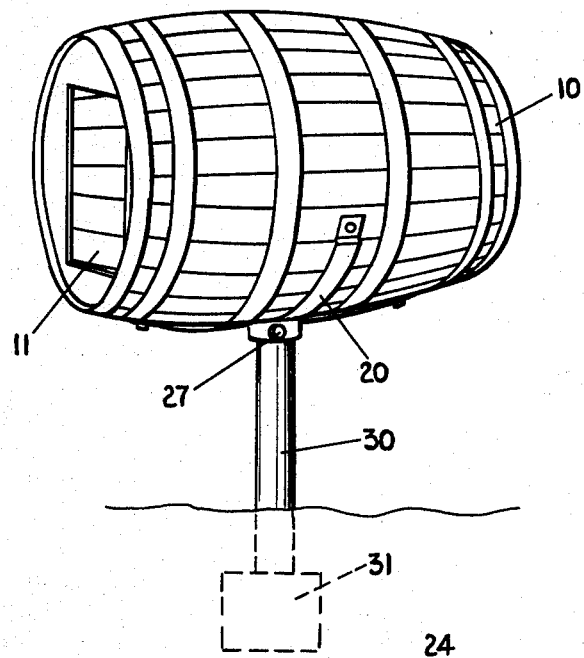
FIG. 1 is a perspective view of the barrel dog house of the present invention.

Referring to the drawings in greater detail, the barrel dog house of the present invention is shown in FIG. 1, which includes barrel 19, mounting bracket 20 and vertical mounting pole 30. As shown, mounting pole 30 is sunken into the ground and anchored by conventional means, such as by concrete 31.

Barrel 10 can be any conventional type of barrel with the size being determined based upon the size of the dog which it is to accomodate. For example, used whiskey barrels, cider kegs and the like are suitable and inexpensive. In one end of the barrel an opening 11 is provided for ingress and egress of the dog. In the case of a larger dog, instead of cutting an opening into the end of the barrel, the entire top member of the barrel can be removed.

Figure 2:
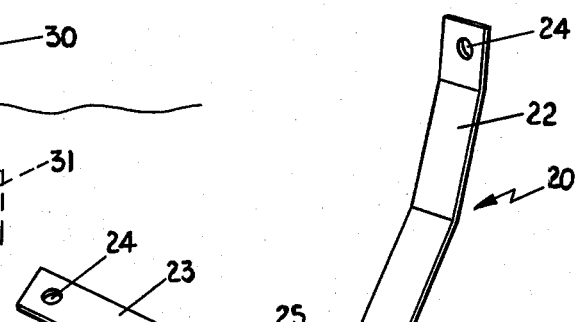
FIG. 2 is a perspective view of the unique mounting bracket of the present invention.
Figure 3:
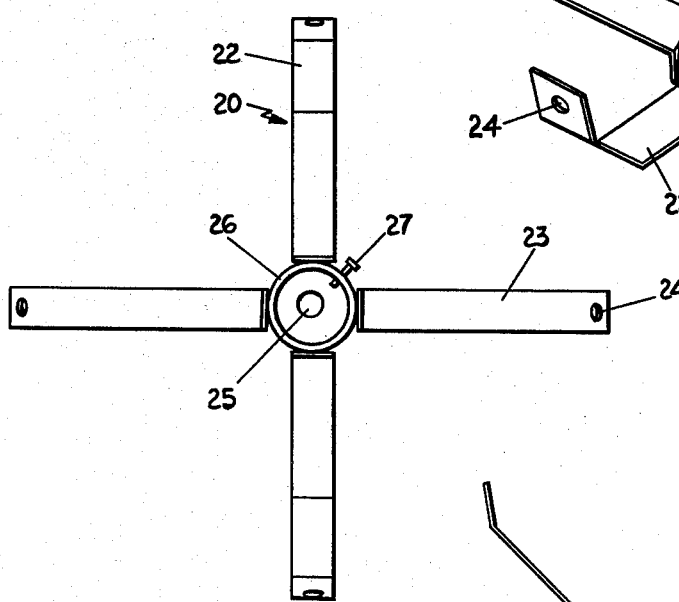
FIG. 3 is a bottom view of the mounting bracket.
Figure 4:
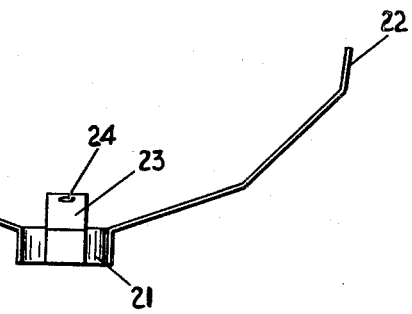
FIG. 4 is a side elevational view of the mounting bracket.

Mounting bracket 20 is shown in FIGS. 2 through 4. As shown, mounting bracket 20 includes a central mounting portion 21 and two pair of radially extending barrel support arms 22 and 23. Support arms 22 are opposed side arms which are contoured to conform to at least the lower side wall contour of barrel 10. Support arms 23 are generally horizontal opposing fore and aft arms.

Apertures 24 are provided near the ends of each of the support arms and aperture 25 is provided in the center of mounting portion 21 for rigidly attaching barrel 10 to mounting bracket 20. Conventional screw means are then used to fasten barrel 10 to bracket 20 through apertures 24 and 25. Preferably, holes are drilled in the corresponding locations of barrel 10, and bolts are passed through holes 24 and hole 25 through the corresponding holes in the barrel and secured by washers and nuts on the inside of the barrel.

For mounting the barrel and bracket assembly to vertical mounting pole 30, it is preferred that central mounting portion 21 include a depending collar which is sized to fit over the top of vertical mounting pole 30. To provide rigidity and anti-rotation to the attachment of the barrel and bracket assembly to the vertical mounting pole, the top of mounting pole 30 can be threaded with corresponding internal threads on depending collar 26. Alternatively, a locking pin or set screw 27 can be provided in collar 26 which can be threaded through a threaded aperture in collar 26 and tightened to bear against pole 30 or which can be a threadless pin which would pass through a corresponding hole in pole 30.

While the above pole mounting means are preferred, other mounting means may be utilized. For example, instead of providing collar 26, a depending mandrel can be provided on the bottom of bracket 20 to fit inside of a tubular mounting pole 30. As discussed above, rigidity and anti-rotation can be accomplished by threading the corresponding members or by the use of locking pins or set screws.

Thus, the barrel dog house of the present invention is inexpensive and easy to assemble and install. Because the barrel is raised off of the ground to any desired height, the dog's environment is kept well above wet and cold ground, as well as snowfall accumulation. The raised barrel provides shade for the dog no matter where it is located. Finally, more dog houses and therefore dogs may be maintained in a smaller area than with conventional dog houses since the dogs have the room under the house available to them and thus require less peripheral space.

Although the preferred embodiments of the present invention have been described and illustrated, it will be obvious to those skilled in the art that various modifications and changes can be made without departing from the spirit of the present invention. Accordingly, the scope of the present invention is deemed to be limited only by the appended claims.

The embodiments of the invention in which an exclusive property or privilege is claimed are defined as follows:

1. An improved mounting means for mounting a barrel dog house of a generally cylindrical configuration on its cylindrical side comprising:

a mounting pole adapted to be mounted in the ground and extending above the ground such that when the dog house is mounted on the pole, the space under the dog house is available to the dog for movement and shade, thereby increasing the space available to the dog in a closely confined area;

a barrel mounting bracket adapted to be mounted on the top of the pole, the mounting bracket including:

an annular collar that fits over the top of the pole, the collar including a central plate mounted at the top thereof, with the plate having an opening means therein for attaching the mounting plate to the cylindrical side of the barrel, the collar being of sufficient length to restrict the barrel from tipping when mounted on the pole;

four (4) mounting arms fastened to the outer periphery of the collar and extending outwardly at 90° intervals around the collar, two mounting arms being opposed side arms that are curved upwardly so as to conform to the cylindrical sides of the barrel, said side arms extending somewhat less than half way around the barrel in a plane perpendicular to the axis of the barrel so as to prevent the barrel from rolling off the mounting means in a sideways direction, the two remaining mounting arms extending longitudinally along the underside of the barrel to a point short of the ends of the barrel, all of the support arms including opening means in the outer ends thereof for attaching the support arms to the barrel;

threaded fastener means that extend through the openings in the support arms and central plate for rigidly attaching the barrel mounting means to the barrel; and pole fastening means for securely fastening the collar to the top of the pole after the barrel has been attached to the mounting bracket such that the barrel and attached mounting bracket cannot be lifted off the pole when the fastening means is secured.

2. A mounting means according to claim 1 wherein the pole fastening means comprises a mating threaded interconnection between the top of the pole and the inner surface of the collar, such that the collar can be threaded on the top of the pole.

* * * * *